(12) United States Patent
Benedix et al.

(10) Patent No.: US 9,841,105 B2
(45) Date of Patent: Dec. 12, 2017

(54) SEALING LIP AND SEAL (75) Inventors: Helmut Benedix, Leichlingen-Witzfeld (DE); Juergen Kurth, Odenthal (DE); Juergen Netzer, Burscheid (DE); Christoph Passow, Leichlingen (DE); Willy Seewald, Remscheid (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/122,152

(22) PCT Filed: May 24, 2012

(86) PCT No.: PCT/EP2012/059737
§ 371 (c)(1),
(2), (4) Date: Jan. 22, 2014

(87) PCT Pub. No.: WO2012/160148
PCT Pub. Date: Nov. 29, 2012

(65) Prior Publication Data
US 2014/0151967 A1  Jun. 5, 2014

(30) Foreign Application Priority Data
May 24, 2011 (DE) .................. 10 2011 076 326

(51) Int. Cl.
*F16J 15/3244* (2016.01)

(52) U.S. Cl.
CPC ................. *F16J 15/3244* (2013.01)

(58) Field of Classification Search
CPC ..... F16J 15/324; F16J 15/3244; F16J 15/3268
See application file for complete search history.

(56) References Cited

U.S. PATENT DOCUMENTS 3,497,225 A * 2/1970 Workman ............... F16J 15/32
134/67
3,515,395 A * 6/1970 Weinand .............. F16J 15/3244
277/559

(Continued)

FOREIGN PATENT DOCUMENTS

DE    10154789 A1    5/2003
DE    10154788 A1 *  6/2003    ........... F16J 15/3244

(Continued)

OTHER PUBLICATIONS

English translation of International Search Report from parent application No. PCT/EP2012/059737.

*Primary Examiner* — Kristina Fulton
*Assistant Examiner* — L. Susmitha Koneru
(74) *Attorney, Agent, or Firm* — Bryan Peckjian; SKF USA Inc. Patent Dept.

(57) ABSTRACT

A sealing lip seals a first space from a second space with respect to a liquid medium present in the first space. The sealing lip has abutment surface configured to abut on a sealing surface of a component that is movable relative to the sealing lip along a direction of movement. A groove is defined in the abutment surface and pumps any liquid medium present in the groove towards the first space along the direction of movement. The groove extends completely within the abutment surface and is enclosed by the abutment surface, such that it does not intersect either lateral edge of the sealing lip.

15 Claims, 4 Drawing Sheets

(56) References Cited

U.S. PATENT DOCUMENTS

| | | | | |
|---|---|---|---|---|
| 4,118,856 A | * | 10/1978 | Bainard | F16J 15/3244 264/295 |
| 4,399,998 A | * | 8/1983 | Otto | F16C 33/7823 277/552 |
| 4,451,050 A | * | 5/1984 | Repella | F16J 15/3244 277/559 |
| 4,497,496 A | * | 2/1985 | Repella | F16J 15/3244 277/559 |
| 5,791,658 A | * | 8/1998 | Johnston | F16J 15/3244 277/549 |
| 6,182,975 B1 | | 2/2001 | Matsushima et al. | |
| 8,322,726 B2 | * | 12/2012 | Kurth | F16J 15/3232 277/559 |
| 2007/0296153 A1 | * | 12/2007 | Kurth | F16J 15/3244 277/309 |
| 2009/0194952 A1 | * | 8/2009 | Alajbegovic | F16J 15/3244 277/559 |
| 2011/0204579 A1 | * | 8/2011 | Donovan | F16J 15/3244 277/559 |
| 2014/0312571 A1 | * | 10/2014 | Kurth | F16J 15/3244 277/559 |

FOREIGN PATENT DOCUMENTS

| | | |
|---|---|---|
| DE | 10154788 B4 | 5/2004 |
| DE | 102006025799 | 12/2007 |
| JP | 2004263797 | 9/2004 |
| JP | 2005220931 | 8/2005 |
| JP | 2009068683 | 4/2009 |

\* cited by examiner

SEALING LIP AND SEAL

CROSS-REFERENCE

This application is the U.S. National Stage of International Application No. PCT/EP2012/059737 filed on May. 24, 2012, which claims priority to German patent application no. 10 2011 076 326.0 filed on May. 24, 2011.

TECHNICAL FIELD

Exemplary embodiments relate to a sealing lip and a seal having such a sealing lip.

RELATED ART

In many technical areas which can often be attributed to mechanical engineering, parts and other components move relative to one another. Operational- or other edge conditions often require here that one, several, or all of the components involved be in contact with a liquid medium in order to make possible a more reliable operation of the machine or subassembly concerned. The liquid medium concerned can for example be a lubricant, i.e. for example an oil or also a grease, however likewise also a coolant or another liquid.

In order to prevent an uncontrolled leakage of the liquid medium from the machine concerned, seals are used which should prevent a corresponding leakage of the liquid medium from one space into another space, wherein at least one of the spaces can also be a vicinity of the machine or the environment.

For this purpose, contacting seals are often used, wherein a sealing lip which is mechanically connected to the one component is in an sliding or rubbing contact with a sealing surface of the respective other component. Here during the operation of the machine concerned, leakage of the liquid medium can thus result for a wide variety of reasons despite the use of an appropriate seal. In addition to an uneven operation, i.e. for example an imbalance in the case of a rotational movement, contaminants and/or mechanical or fluid-mechanical forces can lead to a temporary decrease of the sealing effect of a sealing lip used in the conjunction with such a seal. In other words, it can occur that the liquid medium reaches the region of an abutment surface of the sealing lip and beyond.

For example, in the case of rotational movements which can be supported or guided using an appropriate bearing, radial shaft seals having surface-abutting sealing lips for return pumping of the liquid medium, i.e. for example of the oil, can be provided with a spiral-shaped groove or similar return pumping elements. These are usually designed such that they are subject to a preferred direction of rotation, i.e. then the liquid medium is pumped back especially when the direction of rotation matches the preferred direction of rotation. Pumping structural elements, which are equally effective in both rotational directions, are indeed known in surface-abutting sealing lips, but have not been implemented in the broad field. Thus, in particular with pressurized sealing lips made from polytetrafluoroethylene (PTFE), the oil can leak through the pumping structure and/or through capillary channels in a contact region between the sealing lip material and the shaft surface, i.e. the sealing surface.

A conventional return pumping structure, which is also referred to as spiral helix structures, is formed circular-arc-shaped and projects into the air-side space. In order to achieve no leakage channels and to be statically leak-proof, there is no connection here to the oil space. In other words, for static sealing the pumping structures are closed off by dams at the outlet of the sealing sleeve or by stoppers inside the pumping structure.

However, even with these seals, it occurs, in particular with pressurized sealing lips, that the oil which penetrates into the pumping structure or also through capillary channels in the contact region between the sealing lip material and the sealing surface, i.e. for example the shaft surface, enters into the region of the sealing lip and finally reaches the outer space via the pumping structures.

SUMMARY

There is therefore the need to provide a sealing lip for sealing of a first space from a second space, which sealing lip makes possible an improved sealing effect.

A sealing lip for sealing, according to an exemplary embodiment, of a first space from a second space with respect to a liquid medium present in the first space comprises an abutment surface which is formed to abut on a sealing surface of a component which is movable with respect to the sealing lip along a direction of movement, and a groove in the abutment surface which is formed to pump the liquid medium, upon an ingress of the liquid medium into the groove, to the first space by a movement along the direction of movement. The groove extends completely in the abutment surface and is enclosed by the abutment surface.

A seal according to an exemplary embodiment comprises a reinforcing structure which is at least partially enclosed by an elastomer, and such a sealing lip which is connected to the reinforcing structure.

The recognition underlying exemplary embodiments is that a sealing effect of a sealing lip can be improved by extending the groove completely in the abutment surface and enclosing it thereby, which groove is formed to pump the liquid medium, upon an ingress of the liquid medium into the groove, back to the first space by a movement along the direction of movement. This contradicts the conventional approach which has been used up to now in the field of the implementation of sealing lips having grooves or other return pumping structures. Thus these have, exclusively on one side, an appropriate closure of the hollow body channels, in order to prevent a direct flow-through of the return pumping channels from the oil side to the air side. However, in order to prevent a suction-fixing of the sealing lip to the sealing surface associated therewith, conventional sealing lips are designed such that their pumping structures are open with respect to the air side, in order to make possible a ventilation of the same.

Thus, the recognition underlying exemplary embodiments is that a corresponding ventilation of the groove is not necessary, but rather that the groove can extend completely in the abutment surface, so that due to the openings provided for ventilation, even a quantity of the liquid medium that has penetrated into the groove cannot reach the second space, but rather is guided back into the first space via the groove.

For this purpose, in one exemplary embodiment the groove is preferably spaced at least 100 µm from a boundary line of the abutment region adjacent to the first space. In this way the liquid medium can optionally be pumped into the first space over a short distance or a small spacing when the sealing lip mechanically deforms during normal operation, whereas a direct inflow of the liquid medium from the side of the first space is prevented. Furthermore, the groove is also preferably spaced at least 100 µm from another boundary line of the abutment region adjacent to the second space, in order to also prevent as much as possible an inadvertent leakage of the liquid medium into the second space.

The aforementioned spacings optionally concurrently make possible a necessary deformation of the sealing lip to limit outlet of the liquid medium into the first space and thus to design the outlet as simple as possible. In other words, the tendency is reflected in the specified values namely on the one hand to provide a groove fully contained in the abutment surface, however to hold the distances of the groove from the respective boundary lines as small as possible, without having to take into account an opening of the groove to the first and/or the second space.

In further exemplary embodiments, for increasing the operational reliability, in particular in ensuring that the groove extends completely in the abutment region concerned, greater minimum distances than the aforementioned 100 μm are also provided on one or both sides. Thus it can be advisable to optionally provide minimum distances of at least 300 μm, of at least 500 μm, of at least 1 mm, or of at least 2 mm.

In a sealing lip according to an exemplary embodiment, the groove can be formed such that the liquid medium is also pumped to the first space by a movement against the direction of movement. In this way it is possible to design the groove as a bidirectional return pumping means. This can make possible the use of sealing lips in systems wherein a movement both along the direction of movement in the clockwise direction or clockwise as well as contrary thereto is possible. In the case of rotational movements, the direction of movement is also referred to as direction of rotation or rotational direction.

Moreover, in machines having only one direction of rotation, a simplification of the bearing retainer and the manufacturing of the corresponding machine is optionally possible, since due to the possibility of the bidirectional return guiding of the liquid medium, the seal can optionally be installed on two opposing sides of the machine or its shaft. In other words, an exemplary embodiment of a sealing lip can optionally be attached on both ends of a corresponding shaft, so that for both ends, different seals need not be available solely due to possibly-different directions of rotation.

In a sealing lip according to an exemplary embodiment, the path of the groove can initially move away from a boundary line of the abutment region to the first space and then approach it again. In this way it is possible to facilitate a return pumping of the liquid medium along the direction of movement independent of the direction of the movement. In other words, it makes possible an exemplary embodiment wherein a bidirectional return pumping of the liquid medium is implemented, and movement of the fluid can be effected along the direction of movement of the seal lip (or its counterface) as well as opposite thereto.

In a sealing lip according to an exemplary embodiment, the groove can be mirror-symmetric to a line of symmetry extending perpendicular to the direction of movement. This makes it possible to implement substantially the same return pumping properties of the liquid medium towards the first space both along the direction of movement and against the direction of movement.

In a sealing lip according to an exemplary embodiment, the groove can have an arcuate or curved path, for example a circular-arc-shaped path. The use of an arcuate or curved path, i.e. for example also of a circular-arc-shaped path, can thus optionally prevent flow disturbances and make possible a more uniform transport of the liquid medium within the groove. In exemplary embodiments the groove can thus in particular also have a completely arcuate or completely curved path, or also a completely circular-arc-shaped path.

In a sealing lip according to an exemplary embodiment, the groove can have a first side surface on a side facing towards the first space, which first side surface forms a minimum angle with the abutment surface which does not exceed 70°, wherein the groove has a second side surface on a side facing towards the second space, which forms a minimum angle with the abutment surface which is at least 70°. This shape of the groove with respect to the first side surface, which is facing towards the first space, makes possible on the one hand a guiding of the liquid medium within the groove, and on the other hand an escaping of the liquid medium to the first space due to an elastic deformation of the sealing lip, if the pressure within the groove should exceed a certain value which depends on the particular operating conditions. The profile on the second side surface, which is facing towards the second space, on the other hand makes it possible to implement, due to the rather steep angle, which is at least 70°, an improved wiping function compared to surfaces having smaller angles, since precisely there a pressure-induced lifting of the sealing lip is more improbable due to the steepness of the side surface concerned.

In further exemplary embodiments, the described effects on the first side surface can optionally be increased even further by setting the angle which the first side surface forms with the abutment surface so as not to exceed 60° or 50°. In one exemplary embodiment, for example approximately 45° is used on this side. With respect to the second side surface and the angle which it forms with the abutment surface, the wiping effect can optionally be improved by setting the angle concerned to be at least 80°. In exemplary embodiments a right angle (90°) is used at this point at least in sections, if not completely.

In a sealing lip according to an exemplary embodiment, the groove can extend on at least one end in a ramp-shaped manner with a decreasing depth to a boundary line of the abutment region towards the first space. In this way it is possible to additionally aid a leakage of the liquid medium that has penetrated into the groove towards the first space. A pressure building up in the liquid medium in this region of the groove can thus lift or mechanically deform the sealing lip such that the liquid medium that has penetrated can flow back into the first space. Like the previously defined angle in relation to the first side surface of the groove, the ramp-shaped design of the groove on at least one of its ends, which the boundary line of the abutment region to the first space is facing towards, can thus also aid an outflow of the liquid medium out of the groove into the first space. In exemplary embodiments, an angle between an upper boundary surface of the groove and the abutment surface can thus result along a line of extension of the groove which does not exceed 60°, in other exemplary embodiments 45° or 30°. In exemplary embodiments, angle values of approximately 22.5° can thus occur at this point. The tendency here is that the smaller the angle concerned is, the more improved an outflow of the liquid medium towards the first space is, provided a lower limit angle is not fallen below, which lower limit angle can depend on a plurality of parameters and the precise geometry of the sealing lip.

A sealing lip according to an exemplary embodiment can have a plurality of grooves, wherein the plurality of grooves comprises the groove, and wherein the grooves of the plurality of grooves intersect one another such that the grooves of the plurality of grooves are interconnected with one another. In this way, various advantageous effects can result. On the one hand, due to the mutual intersecting of the individual grooves a quasi-encircling groove can form, so that along the boundary line between the abutment surface of the sealing lip and the first space, at each position at least one groove of the plurality of grooves is to be found, so that liquid medium from the first side which reaches under the abutment surface of the sealing lip in any case finds a groove and can be pumped back through it to the first space.

Moreover, in an exemplary embodiment, the liquid medium that has penetrated into the groove in the region of the interfaces at which two respective grooves intersect can also optionally be guided back more rapidly to the first space, since optionally the liquid medium need not initially follow the groove and first be pumped towards the second space. In other words, a return pumping can optionally be improved by the shaping of the grooves in the described manner, even though the intersection points are themselves pumping-neutral.

In further exemplary embodiments, the plurality of grooves can also be embodied identically. In such a case, for example the shape of the individual grooves can be optimized for the particular application, so that the return-pumping effect of the grooves of the sealing lip is improved overall.

A sealing lip according to an exemplary embodiment can be manufactured from a material that comprises polytetrafluoroethylene and a fine-grained filler, for example a fine-grained mineral filler. By using the fine-grained filler, for example fine-grained wollastonite, various effects can possibly be achieved. Thus the use of this filler can make possible a more homogeneous surface of the sealing lip in the region of the abutment surface, which leads to a better sealing effect even under static conditions i.e., when the sealing lip is not moving relative to the component (counterface) having the sealing surface. Also, by using fine-grained fillers, the inherent capillary effect of the material of the sealing lip can be reduced, through which capillary effect the liquid medium from the first space could possibly undesirably leak into the second space.

A sealing lip according to an exemplary embodiment can be manufactured from a material which comprises an elastomer, and wherein the sealing lip is formed in a one-piece manner with an elastomer structure made from the material, which elastomer structure at least partially encases a reinforcing structure. In this way it is not only possible to optionally simplify the manufacture in that now a separate manufacture and use of the sealing lip having the elastomer structure is possible to save on, but rather the possibility results to directly exploit the mechanical properties of the elastomer for the sealing lip. Thus it is possible to improve a static sealing behavior due to the elastic behavior. In the case of the movement of the seal relative to the component which comprises the sealing surface, it is likewise possible to reduce a friction of the sealing lip on the sealing surface, which in turn can have the result of a lower noise development, a lower wear, and/or a lower energy consumption.

In exemplary embodiments, the liquid medium can for example be an oil or a grease for lubricating and/or likewise for cooling, such as a coolant liquid, i.e. for example a water-based coolant liquid. In principle, however, in the context of one exemplary embodiment all liquid media are suitable for use, provided the corresponding materials for forming the sealing lip and optionally further structures are not affected by the materials concerned and/or are compatible therewith.

In a seal according to an exemplary embodiment, the reinforcing structure can have a first section and a second section, wherein the first and the second section of the reinforcing structure are substantially perpendicular to each other. The sealing lip can be connected to the second section of the reinforcing structure or embodied in a one-piece manner with the reinforcing structure, wherein the abutment surface is formed to abut on the sealing surface substantially parallel to the first section of the reinforcing structure. Exemplary embodiments of a seal can thus also be integrated into mechanically more-complex seals, wherein a corresponding reinforcing structure is provided which can in turn also fulfill an at least partial shaping function.

A seal according to an exemplary embodiment can for example be implemented in the form of a radial shaft seal, such as can be used for example in the motor- and drive-train-field or in the pump field. Thus for example exemplary embodiments can be used in the context of pumps, motors, transmissions, clutches, differentials, and other components of a drive train, for example on output shafts. Furthermore, exemplary embodiments can also be used in other systems wherein shafts and other components having changing directions of rotation are used, i.e. for example in the field of construction machines as well as of motor vehicles.

BRIEF DESCRIPTION OF THE DRAWINGS

Exemplary embodiments are described in more detail below with reference to the accompanying figures.

DETAILED DESCRIPTION OF THE INVENTION

Before exemplary embodiments are described in more detail in the context of FIGS. 1 to 4 and are explained in more detail with respect to their operation, it is appropriate to point out that in the context of the present description, summarizing reference numbers are used for objects, structures, and other entities if, with respect to the entity itself, a plurality of corresponding entities within an exemplary embodiment or within a plurality of exemplary embodiments or the relevant type of entities is discussed in more detail. In this way it is possible to keep the description more concise and shorter, since unnecessary repetitions can be prevented, since descriptions which relate to one entity are also transferable to other entities in other exemplary embodiments, as long as it is not explicitly stated otherwise or is evident from the context. In contrast thereto, individual reference numbers based on the corresponding summarizing reference numbers are used if individual entities are denoted. Entities which occur multiple times in an exemplary embodiment or in different exemplary embodiments can thereby be embodied identically and/or differently with respect to some of their technical parameters. It is thus for example possible that a plurality of entities can be embodied identically within an exemplary embodiment with respect to one parameter, however embodied differently with respect to another parameter.

Figure 1:
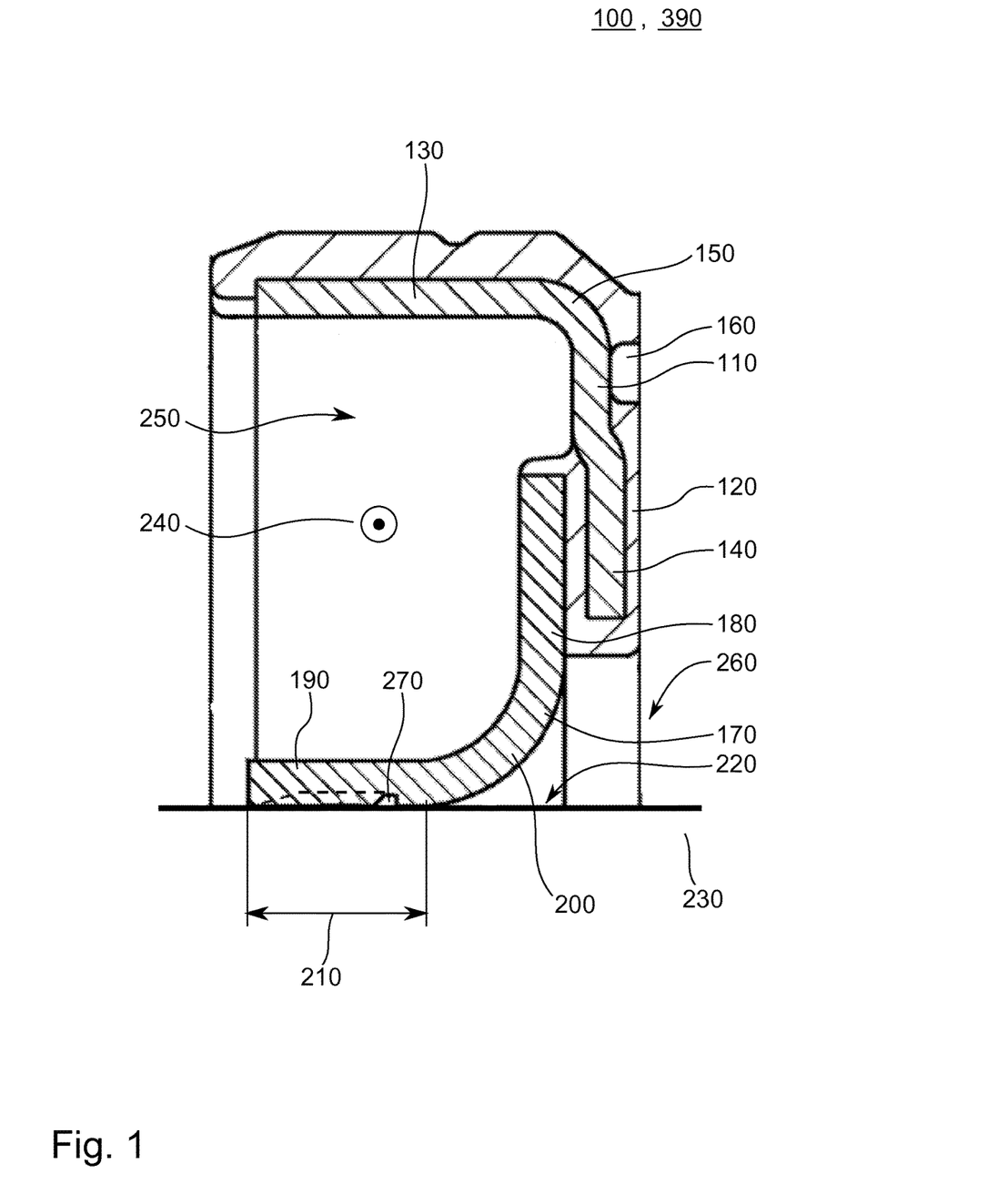
FIG. 1 shows a cross-section through a seal having a sealing lip according to an exemplary embodiment.

FIG. 1 shows a cross-sectional view through a seal 100 according to an exemplary embodiment. The seal 100 comprises a reinforcing structure 110, which is at least partially embedded in an elastomer structure 120. The reinforcing structure 110 has a first section 130 and a second section 140 which are substantially perpendicular to each other. While the second section 140 is completely encased by the elastomer structure 120, the first section 130 is only incontact with the elastomer structure 120 in an outer region. Also in a transition section 150 of the reinforcing structure 110, which transition section 150 is disposed between the first section 130 and the second section 140, the reinforcing structure 110 is only surrounded by the elastomer structure 120 in an outer region. In addition, the transition section 150 further has an opening 160 in the elastomer structure 120 which provides a direct access to the reinforcing structure 110. The opening 160 has a limited extension in the circumferential direction. In particular it is not encircling. Rather, it is merely a discrete circular opening, at which the reinforcing structure 110 (reinforcing ring) can be held in position during an elastomer coating manufacturing step. It is thus a manufacturing-necessitated opening. Of course, in other exemplary embodiments, other openings or holders can be provided at other locations, with which the seals 100 or their reinforcing structures 110 can be held during their production, if these are necessary at all. Of course, openings or other recesses in the elastomer structure 150 can also be provided for other reasons, perhaps for assembly purposes.

In other exemplary embodiments, the reinforcing structure 110 can also be coated with the elastomer differently with respect to one, several, or all of its sections. Thus for example in other exemplary embodiments the reinforcing structure 110 can also be completely surrounded with the elastomer or enclosed thereby.

The seal 100 further comprises a sealing lip 170 which is connected to the elastomer structure 120 in the region of the second section 140. The sealing lip 170 can in this case for example be connected to the elastomer structure 120 using a materially-bonded connection. A "materially-bonded connection" is understood to mean all connections wherein the connecting partners, i.e. for example the sealing lip 170 and elastomer structure 120, are held together by atomic or molecular forces. They are often concurrently non-detachable connections, which can only be separated again by destruction of the connecting means. Thus the sealing lip 170 can for example be bonded to the elastomer structure or can also be vulcanized therein.

In this case the sealing lip 170 has a first section 180 which is connected to the elastomer structure 120 in the described manner. A second section 190, which is separated from the first section 180 by a transition section 200, comprises an abutment surface 210. The abutment surface 210 is in this case in contact with a sealing surface 220 of a component 230, or pressed onto the sealing surface 220 due to its elastic properties. The component 230 is in this case movably disposed with respect to the sealing lip 170 along a direction of movement 240, which extends out of the illustration plane in the view shown in FIG. 1.

Here the sealing lip 170 separates a first space 250 from a second space 260. A liquid medium is typically disposed in the first space 250, wherein it can for example be a grease or an oil for lubricating or also a liquid for cooling. The first space is often an interior of a machine or at least a part thereof. The second space 260 often represents an external region of the machine concerned, i.e. for example the environment or an adjacent component.

Figure 2:
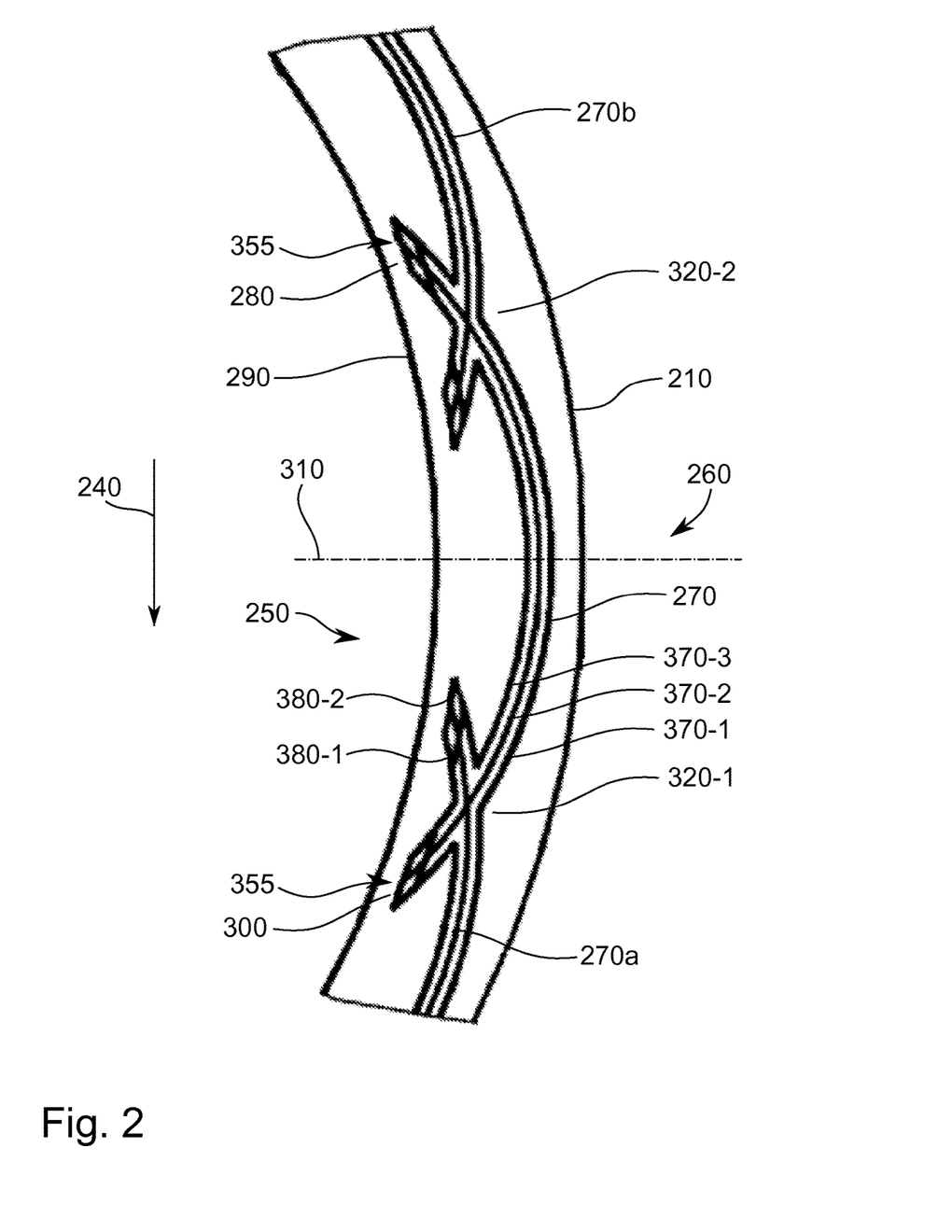
FIG. 2 shows a perspective view of an abutment surface of a sealing lip according to an exemplary embodiment.
Figure 3:
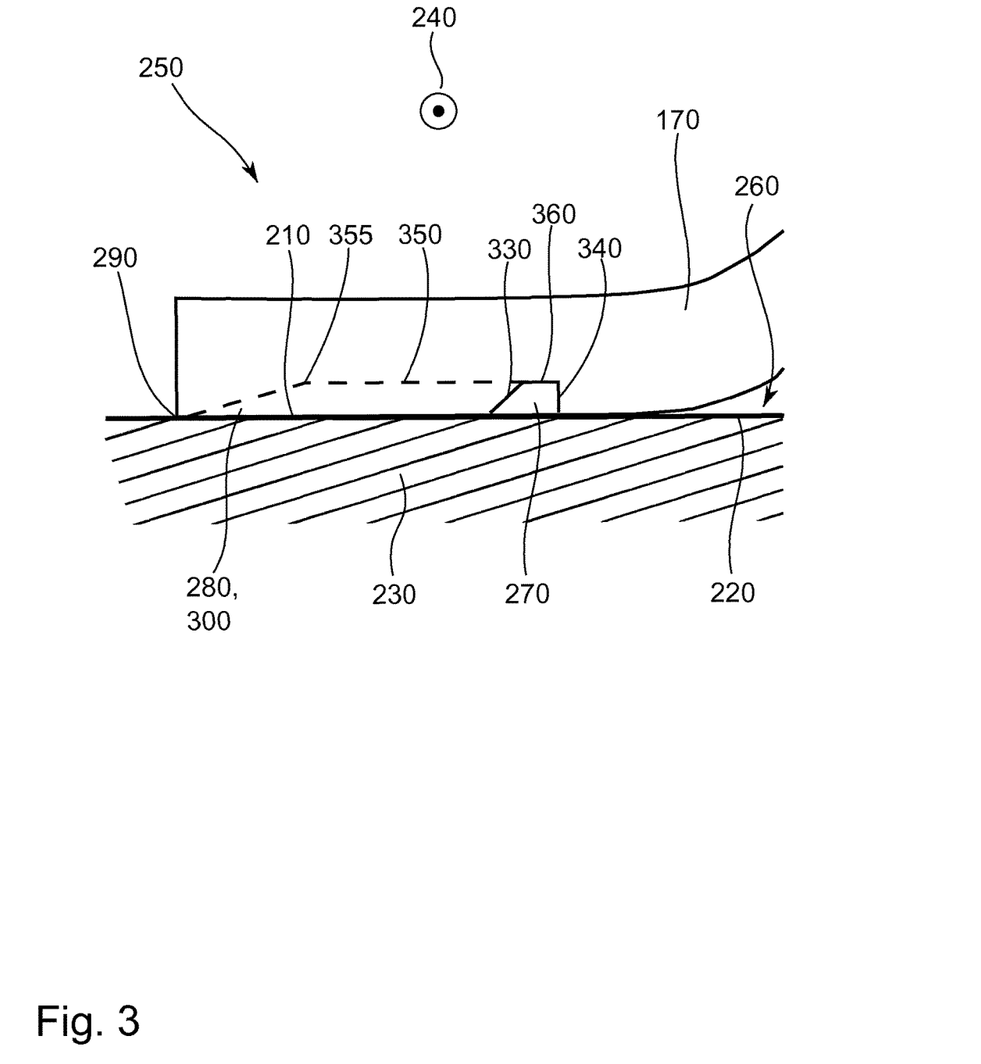
FIG. 3 shows an enlargement of the cross section shown in FIG. 1 through a sealing lip according to an exemplary embodiment.

The abutment surface 210 comprises a groove 270 which shall be described in more detail in the context of FIGS. 2 and 3. As is embodied there in even more detail, the groove is formed to pump the liquid medium, upon an ingress of the liquid medium from the first space into the groove, back to the first space by a movement along the direction of movement 240 of the abutment surface towards the sealing surface of the component. The groove 270 extends in this case completely in the abutment surface 210 and is enclosed thereby.

In order to illustrate this in more detail, FIG. 2 shows a perspective view of the abutment surface 210, while FIG. 3 shows an enlarged view of the region around the abutment surface 210 from FIG. 1. In this case FIG. 2 also shows two more neighboring grooves 270a and 270b in addition to the groove 270.

Starting from a first end 280, the path of the groove 270 initially moves away from a boundary line 290 of the abutment region 210 to the first space 250, in order to then approach the boundary line 290 again at a second end 300. In this way it is possible that a quantity of liquid medium that has entered into the groove 270 is pumped to the first space 250 along the direction of movement 240 as well as with a movement opposite to the direction of movement 240. In other words, this shape of the groove 270 makes possible a bidirectional return pumping of the liquid medium towards the first space 250.

Furthermore, in the implementation shown in FIG. 2, the groove 270 is mirror-symmetric with respect to a symmetry line 310 that extends perpendicular to the direction of movement 240. In this case, when liquid medium penetrates into the groove 270 it is not only possible to also pump the liquid medium opposite to the direction of movement 240, but in fact the transport properties are independent of the direction of movement along the direction of movement 240. In other words, in the case of a symmetrical implementation of the groove 270, the transport properties of the liquid medium to the first space 250 do not differ depending on the direction along the direction of movement 240. Therefore in this context instead of the term "movement direction," the term "movement line" can also be used, which indicates the optionally-not-straight line that traces a point on the component 230 when the component moves relative to the abutment surface 210 of the seal 100.

Here the groove 270 is arcuate or has a curved path. In this case, flow disturbances can optionally be reduced or prevented, which can optionally lead to a more uniform transport of the medium that has penetrated into the groove 270. More specifically, in the exemplary embodiment shown in FIGS. 1 to 3, the groove 270 is designed in a completely circular-arc-shaped manner.

As has already been briefly mentioned above, the sealing lip 170 in the exemplary embodiment shown in FIGS. 1 to 3 has not only one groove 270, but rather a plurality of grooves 270. In this case the plurality of grooves also comprises, in addition to the groove 270, respective grooves 270a and 270b adjacent on both sides along the direction of movement 240. The grooves 270 of the plurality of grooves are disposed such that they intersect one another. Thus for example the groove 270 and the groove 270a, which is adjacent in the direction of movement 240, have an intersection region 320-1, in which the two grooves intersect one another. An intersection region 320-2 of the two grooves also lies between the groove 270 and the groove 270b adjacent against the direction of movement 240, wherein these two grooves intersect. In these regions there is thus an intersection of the grooves 270.

In this way, the grooves 270 of the plurality of grooves are thus interconnected with one another so that a quantity of the liquid medium, which has entered in one of the grooves 270 can switch from one groove into another at one of the intersection regions 320. Although the intersection regions themselves are pumping-neutral, it is however possible in this way to optionally transfer the liquid medium back to the first space 250 more rapidly from the groove 270 by switching the quantity that has entered at least partially from one groove into the other.

In addition there is the possibility to realize a completely encircling or at least partially closed common groove using the intersecting grooves, wherein the individual grooves 270 that form this common groove can be optimized with respect to their transport properties, in particular their return pumping properties. It can thus optionally be possible to dispose the grooves 270 such that along the boundary line 290, at least one groove 270 can be found at each point perpendicular to it, so that along the boundary line 290 a groove is available at each point, in order to receive a quantity of the liquid medium leaking from the first space 250 and transport it back thereto.

In this exemplary embodiment, the grooves 270 of the plurality of grooves are identically or equally embodied. In this way it can optionally be possible to minimize undesired variations of the return pumping properties of the grooves 270. This can be an interesting option in particular with seals which are translationally invariant along their direction of movement 240, i.e. for example seals for rotational movements.

Although the grooves 270 are contained in the abutment surface 210 and enclosed by it, they can however be disposed and designed such that they extend as close as possible to the boundary line 290 and/or a corresponding boundary line between the abutment surface 210 and the second space 260. This small-as-possible distance to the first space 250 can optionally make possible an easier delivery of the medium located in the groove 270 to the first space. However, the distance should be chosen such that even under unfavorable operating conditions, the groove 270 still extends completely in the abutment surface 210 and is enclosed by it. Thus it can be advisable to provide a minimum distance of at least 100 µm, of at least 300 µm, of at least 500 µm, of at least 1 mm, or of at least 2 mm. In other words, the ends 280, 300 of the groove 270 can have at least the above-mentioned minimum distances from the boundary line 290.

The distance of the groove 270 to the second space 260 can also be appropriately chosen to make possible an efficient-as-possible utilization of the abutment surface 210. Thus a larger radius of curvature of the groove can optionally be implemented, which can optionally decrease a lifting of the sealing lip caused by a pressure increase. In other words, it can be advisable to use the available contact region or the available abutment as optimally as possible, and nonetheless ensure that the groove 270 is contained in the abutment region 210 and enclosed thereby.

As FIG. 3 shows in more detail, the groove 270 has a first side surface 330 which is facing towards the first space 250. Opposite the first side surface 330, the groove 270 further has a second side surface 340 which is facing towards the second space 260.

The first side surface 330 in this case forms a minimum angle with the abutment surface 210, which angle does not exceed 70° in the exemplary embodiment shown in FIGS. 1 to 3. In this way it is possible that liquid medium that has entered into the groove 270 can optionally exit the groove towards the first space 250 when a temporary deformation of the sealing lip 170 occurs due to the pressure built up in the groove 270, during which temporary deformation the liquid medium exits the groove 270 towards the first space 250. A "capture" of a quantity of the liquid medium by one of the grooves 270 is also optionally facilitated by this geometry.

In opposition thereto, in the exemplary embodiment depicted in FIGS. 1 to 3, the groove 270 has a second side surface 340 which forms a minimum angle with the abutment surface 210 which is at least 70°. This substantially steeper angle in comparison to the first side surface effects an improvement of the wiping effect with respect to the medium that has entered into the groove 270 in that a pressure buildup which could lead to a lifting of the sealing lip 170 in the region of the abutment surface 210 is less likely. In other words, due to the design of the second side surface 340, the liquid medium tends to be held in the groove 270.

In further exemplary embodiments, other angles can optionally be used for amplifying the above-mentioned effects. Thus it can for example be advisable in some exemplary embodiments to provide angles between the first side surface 330 and the abutment surface 210 which do not exceed 60° or even 50°. Thus the first side surface 330, as shown in FIG. 3, for example forms an angle of approximately 45° with the abutment surface 210.

Also with respect to the second side surface 340, for amplifying the above-described effect it can optionally be advisable to provide an angle which is at least 80°. Thus the second side surface 340, as shown in FIG. 3, forms for example a right angle with the abutment surface 210.

However, different angle relationships can also be implemented in exemplary embodiments. Thus a simple perpendicular side surface can also optionally be provided both as the first and as the second side surface 330, 340. Other geometries, perhaps a semicircular or differently-shaped profile of the groove 300, can also be implemented in other exemplary embodiments. This shows that the precise design of the groove with respect to its profile, as has been described above, is optional.

The sealing lip 170, as it is depicted in FIGS. 1 to 3, has a section on at least its ends 280, 300 on which it extends in a ramp-shaped manner with a decreasing depth to the boundary line 290 of the abutment region 210 towards the first space 250. FIG. 3 shows this in the form of a dashed line 350, which illustrates the path of the groove 270 outside the cross-sectional plane shown in FIG. 3. In a ramp region 355 of the groove 270, a distance between an upper boundary surface 360 of the groove 270 and the abutment surface 210 thus reduces, wherein the ramp region 355 is disposed at least in the region of one of the two ends 280, 300 of the groove 270.

In FIG. 2, the profile of the groove 270 is depicted by three parallel, arcuate lines 370 outside of the region around the ends 280, 300 or the ramp regions 355. In this case, the outermost of the three lines 370-1 indicates the position of the second side surface 340, i.e. the edge of the groove 270 facing towards the second space 260, while the middle curved line 370-2 reflects the edge formed between the upper boundary surface 360 and the first side surface 330. Finally, the third curved line 370-3 facing towards the first space 250 shows in FIG. 2 the points at which the first side surface 330 opens into the abutment surface 210.

Respectively in the region of the ends 280, 300, FIG. 2 shows the above-described ramp-shaped extension of the groove 270 in the form of two parallel-extending lines 380-1, 380-2. Here the line 380-1 shows the edge at which the depth of the groove 250, i.e. the distance of the upper boundary surface 360 from the abutment surface 210 begins to decrease, while the line 380-2 shows the ending of the corresponding line. Along a direction of extension of the groove 270, the upper boundary surface 360 thus forms an angle with the abutment surface which does not exceed 60°, in other exemplary embodiments 45° or 30°. In the exemplary embodiment shown in FIG. 1, the angle falls at approximately 22.5°. The tendency here is also that the smaller the angle concerned is, the greater the improvement of the outflow of the liquid medium towards the first space. If possible however, the angle should not fall below a lower limit angle of 2°.

In the exemplary embodiment shown in FIGS. 1 to 3, there is a PTFE shaft seal ring or a radial shaft seal 390 having a bidirectional return pumping means in the form of the above-described groove 270. For return pumping of oil, radial shaft seal rings having surface-abutting sealing lips are already conventionally provided with a spiral-shaped groove or similar return pumping elements. These are usually designed such that they are subject to a preferred direction of rotation. Pumping structure elements which are equally effective in both rotational directions are indeed known from the literature, but they have not been able to be put into practice and in the broad field. In particular with pressurized sealing lips made of material 1, the oil can thus leak through the pumping structures and/or through capillary channels in the contact region between the sealing lip material and the shaft surface.

Conventional radial shaft seals have return guiding structures which, however, in principle exit the abutment region, in order to make possible a ventilation or airing of the corresponding structures. Thus, for example, using this ventilation it should be prevented that the sealing lips suction-fix on the corresponding sealing surface. Often, however, for static sealing the corresponding pumping structures are closed off by dams at the outlet of the corresponding sealing sleeve or by other stoppers inside the pumping structure.

Exemplary embodiments are based on the recognition that a sealing lip or also a sealing sleeve, which can optimally be manufactured from a material comprising PTFE (polytetrafluoroethylene), in order to make possible an improved sealing, in that the grooves serving as return pumping structures are not ventilated, but rather are disposed completely within the abutment surface 210 and are enclosed thereby. Exemplary embodiments are thus based on the recognition that the feared sucking of the sealing lip 170 is much less pronounced. An improvement of the sealing effect can therefore be achieved by the open-lying return pumping structures of conventional sealing lips being closed off on both sides, through which return pumping structures oil or a liquid medium which has penetrated into the return pumping structures can reach the air side of the seal; the groove 270 is thus completely enclosed by the abutment surface 210.

In other words, exemplary embodiments are based on the recognition that it is possible to expand the contact region (abutment surface 210) of the sealing lip 170 such that it goes beyond the length of the (e.g. circular) pumping structures in the shape of the groove 270 and thus also encloses the grooves 270 on the air side (second space 260) of the seal.

Exemplary embodiments therefore comprise, as has also been shown in FIGS. 1 to 3, a seal 100 having one or more circular-arc-shaped pumping structures, which intersect one another approximately at the halfway point of the circular arc height. In this way, oil or another liquid (liquid medium) which has penetrated into the groove 270 can be diverted to the interfaces or intersections or intersecting regions 320 and pumped back to the first space 250.

The groove path on the oil side (first space 250) in this case extends over a ramp having a continuously tapering cross-section into a circumferentially closed ramp. Here the angular positioning of the groove in conjunction with its ramp-shaped outlet aids the return pumping in the abutment region 210 (sealing lip contact region).

If the sealing lip 170 is manufactured from a material that comprises polytetrafluoroethylene, it can further be advisable to use fine-grained fillers in contrast to conventional glass-fiber fillers. Mineral fillers, such as wollastonite, represent, e.g., examples for appropriate fine-grained fillers. These can lead to a more homogeneous surface of the sealing sleeve (abutment surface 210) and can thereby possibly reduce capillary effects in the contact region, i.e. on the abutment surface 210 of the sealing system, and thus improve the static sealing behavior of the seal 100.

In principle, the contact pressure exerted by the sealing lip 170 itself initially increases starting from a boundary line, which separates the abutment region 210 from the second space 260, towards the boundary line 290 to the first space 250. However, this reaches a maximum at a distance from the boundary line 290, which distance is dependent on a plurality of parameters, before the contact pressure towards the boundary line 290 decreases again. There is therefore a pressure maximum which typically extends in the abutment surface 210 at a distance from the boundary line 290, parallel thereto. This pressure maximum often lies several 100 μm away from the boundary line 290. Because the groove 270 is brought as close as possible to the boundary line 290, this groove 270 is also led into a region which lies beyond the pressure maximum. The grooves 270 thus "tunnel under" this region and more closely approach the boundary line 290, so that due to the force exerted by the sealing lip 170 itself, the liquid medium can be transferred in a targeted manner to the first space 250.

In summary, the exemplary embodiment shown in FIGS. 1 to 3 is thus based on that the operative return pumping region for the liquid medium (e.g. oil or grease) represents the groove 270 which, during an appropriate direction of rotation of the sealing lip 170 with respect to the component 230 at an acute angle with respect to the oil-side sleeve outlet, i.e. to the respective ends 280, 300, is directed towards the first space 250. The intersecting circular-arc grooves 270 lead the liquid medium, which has penetrated into the groove region having the obtuse angle of incidence, over into the connecting arc of the groove, and thus to the oil side, i.e. back to the first space 250. The air-side region, i.e. the second space 260, of the outwardly-closed circular arcs (grooves 270) acts as an additional pumping structure and thus additionally aids the crossed or intersecting grooves 270. A leakage of the liquid medium to the air side or into the second space 260 directly via the groove 270 is prevented by the expanded contact region, i.e. the abutment surface 210, which surrounds the groove 270. The continuously decreasing cross-section in the region of the ramp (ramp region 355), i.e. in the region of the ends 280, 300, produces a shear gradient in the liquid medium (e.g. oil film), which continuously decreasing cross-section aids a return pumping of the medium to the first space 250 (oil side).

Figure 4:
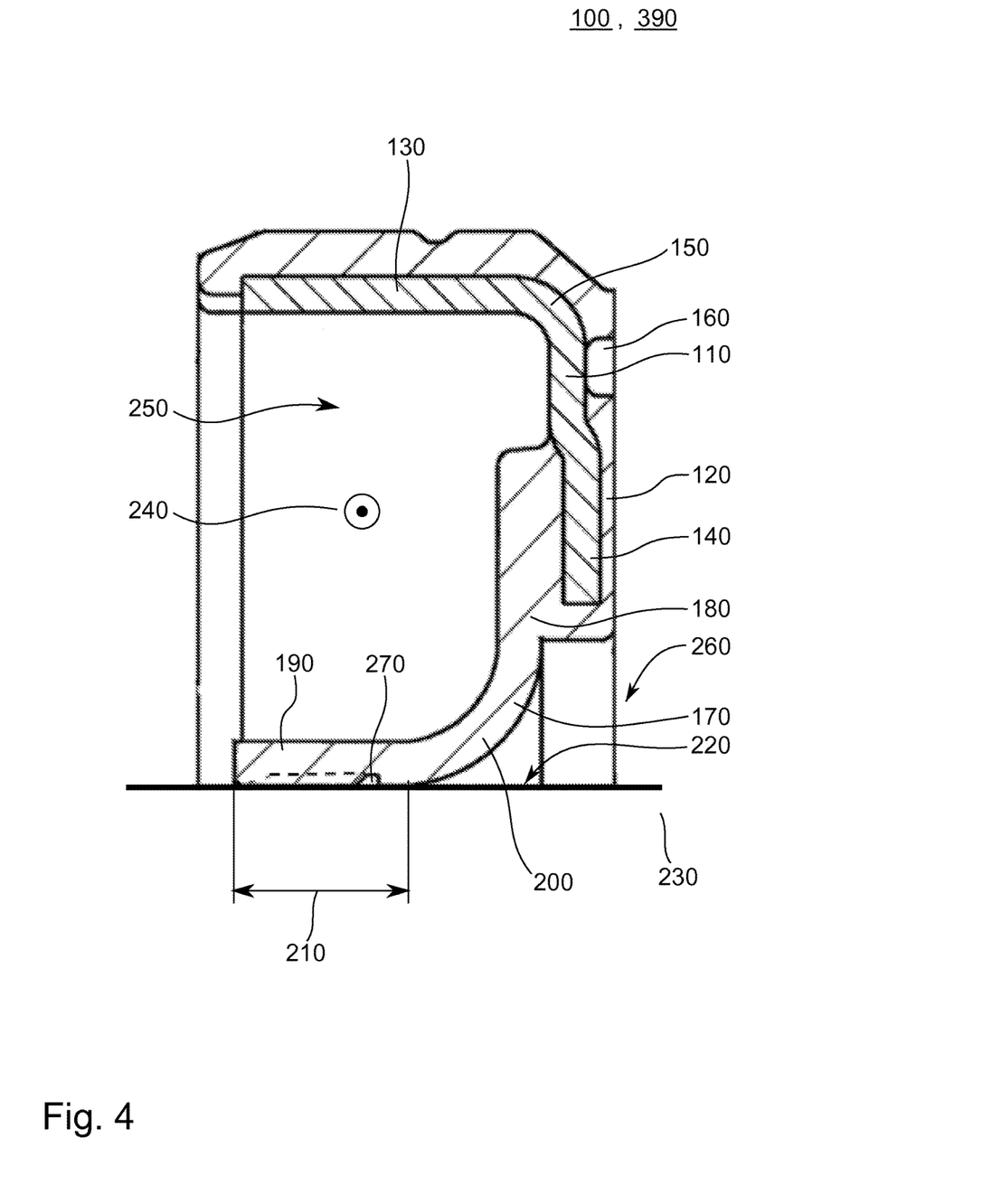
FIG. 4 shows a cross section through a seal having a sealing lip according to a further exemplary embodiment.

FIG. 4 shows a further exemplary embodiment of a sealing lip 170 or a seal 100 which resembles the exemplary embodiment described in FIGS. 1 to 3, for which reason reference is made at this point to the above description. The exemplary embodiment shown in FIG. 4 is more specifically a radial shaft end seal 390 having a bidirectional return pumping means, wherein the sealing lip 170 exhibits a lower friction with respect to the sealing surface 220 of the component 230. This is therefore also referred to as a "low-friction" sleeve seal ring.

The seal 100 shown in FIG. 4 differs from the seal 100 previously shown in FIGS. 1 to 3 essentially in that now the sealing lip 170 is manufactured from the material of the elastomer structure 120 and is formed from the material in a one-piece manner with it. In other words, in this exemplary embodiment of a sealing lip 170, it is manufactured from a material that comprises an elastomer, and wherein the sealing lip 170 is formed in a one-piece manner with the elastomer structure 120 from the material, which at least partially surrounds a reinforcing structure 110. In the exemplary embodiment shown in FIG. 4, the first section 180 of the sealing lip 170 is thus formed in a one-piece manner with the material of the elastomer structure 120 that encloses the second section 140 of the reinforcing structure 110.

By using the material of the elastomer structure 120, it can be possible not only to simplify the manufacturing such that now the sealing lip 170 no longer needs to be manufactured as a separate component and connected to the elastomer structure 120. In addition, due to the use of the material comprising the elastomer for the sealing lip 170, the friction between the abutment surface 210 of the sealing lip 170 and the sealing surface 220 of the component 230 can also optionally be reduced. Thus a lower friction and/or a lower energy consumption and thus possibly an increased degree of efficiency can optionally be achievable.

In addition, the elastic behavior of the material, i.e. of the sleeve material, can optionally lead to a statically-sealing abutting of the sealing lip 170 on the sealing surface 220, i.e. for example on a shaft surface. In this way better static sealing of the first space 250 from the second space 260 can optionally be achievable. Thus for example possible capillary effects, such as are known with collar seals made from polytetrafluoroethylene (PTFE), do not occur with this material.

The seal 100 shown in FIG. 4 thus represents a seal ring having a one-piece-manufactured seal sleeve made from polymeric material and (e.g. circular-arc-shaped) pumping structures which are independent of the direction of rotation.

Exemplary embodiments can be used in a variety of applications. In addition to the already-mentioned radial shaft seals, such as are used for example in the motor- and drive-fields, a variety of further application scenarios are among the possible areas of application of exemplary embodiments. The exemplary embodiments shown in FIGS. 1 to 4 are radial shaft seals of a motor application in the field of pumps. More specifically, the component 230 is the main shaft of a corresponding pump, wherein the seal 100 is a seal of the main shaft with respect to the housing of the pump. However, exemplary embodiments can also be used in other fields of pump-, motor-, and drive-technology, i.e. for example in the area of transmission technology and of clutch technology for sealing of output shafts of automotive transmissions, to name just one example. Exemplary embodiments can, however, also be used in conjunction with other components and/or in other fields of technology. Thus exemplary embodiments can be used, for example, with all machines, subassemblies, and components in which changing directions of rotation occur between rotating components and which make advisable or require a seal. Such examples can come, for example, from the field of vehicle technology or construction equipment technology.

REFERENCE NUMBER LIST

100 Seal
110 Reinforcing structure
120 Elastomer structure
130 First section
140 Second section
150 Transition section
160 Opening
170 Sealing lip
180 First section
190 Second section
200 Transition section
210 Abutment surface
220 Sealing surface
230 Component
240 Direction of movement
250 First space
260 Second space
270 Groove
280 First end
290 Boundary line
300 Second end
310 Line of symmetry
320 Intersection region
330 First side surface
340 Second side surface
350 Lines
355 Ramp region
360 Upper boundary surface
370 Line
380 Line
390 Radial shaft seal

The invention claimed is:

1. A sealing lip for sealing a first space is separated from a second space by said sealing lip, the sealing lip comprising:
    an abutment surface, which abuts a counterface of a component movable relative to the sealing lip; and
    a curved groove defined on the abutment surface, enclosed therewithin, the curved groove including a first side surface disposed on a first side of the groove nearest to the first space and a second side surface disclosed on a second side of the groove nearest to the second space,
    wherein the groove extends solely within the abutment surface and is enclosed by the abutment surface such that the groove does not intersect either a first lateral edge or a second lateral edge of the sealing lip,
    wherein the groove is one of a plurality of grooves defined in the abutment surface, wherein each groove of the plurality of grooves intersects with proximity to the respective first end portion and respective second end portion of the plurality of grooves,
    wherein a slope of the second side surface is of a greater angle than that of a slope of the first side surface with respect to the counterface,
    wherein the groove has a first end portion, a second end portion, and a middle portion, wherein the slope of the first side surface varies with respect to a circumference of the sealing lip, and
    wherein the slope of the first side surface is of a greater angle along the middle portion of the groove than the slope of the first side surface along the first end portion and along the second end portion.

2. The sealing lip according to claim 1, wherein the groove is configured to direct a liquid medium towards the first space in a direction opposite to a direction of movement of the component.

3. The sealing lip according to claim 2, wherein the groove is mirror-symmetric with respect to a line of symmetry that extends perpendicular to a direction of movement of the component.

4. The sealing lip according to claim 3, wherein the groove is formed as an arcuate path or a circular-arc-shaped path.

5. The sealing lip according to claim 4, wherein the first slope or the second slope of the first side surface forms an angle with the counterface of the component that is seventy degrees or less, and
wherein the slope of the second side surface forms an angle with the counterface of the component that is at least seventy degrees.

6. The sealing lip according to claim 1, wherein sealing lip comprises polytetrafluoroethylene and a fine-grained mineral filler.

7. The sealing lip according to claim 1, wherein the sealing lip comprises an elastomer, and is integrally formed in a one-piece manner with an elastomeric structure made from the same material that at least partially surrounds a reinforcing structure of a radial seal device.

8. The sealing lip according to claim 1, wherein the groove is mirror-symmetric with respect to a line of symmetry that extends perpendicular to a direction of movement of the component.

9. The sealing lip according to claim 1, wherein the groove is formed as an arcuate path or a circular-arc-shaped path.

10. The sealing lip according to claim 1, wherein the first slope or the second slope of the first side surface forms an angle with the counterface of the component that is seventy degrees or less, and
wherein the slope of the second side surface forms an angle with the counterface of the component that is at least seventy degrees.

11. The sealing lip according to claim 6, wherein portions of the groove in the first end portion and in the second end portion decrease in depth with respect to proximity to the first space.

12. The sealing lip according to claim 1, wherein the groove is one of a plurality of grooves defined in the abutment surface, wherein each groove of the plurality of grooves intersects with proximity to the respective first end portion and respective second end portion of the plurality of grooves.

13. The sealing lip according to claim 6, wherein the first end portion and the second end portion of the groove both terminate at a spacing of at least 100 μm from a first lateral edge of the abutment surface nearest to the first space, and
wherein the middle portion of the groove is contained within the abutment surface.

14. A seal comprising:
a reinforcing structure at least partially encased by an elastomer; a sealing lip, wherein a first space is separated from a second space by said sealing lip,
an abutment surface, which abuts a counterface of a component movable relative to the sealing lip; and
a curved groove defined on the abutment surface, enclosed therewithin, the curved groove including a first side surface disposed on a first side of the groove nearest to the first space and a second side surface disclosed on a second side of the groove nearest to the second space,
wherein the groove extends solely within the abutment surface and is enclosed by the abutment surface such that the groove does not intersect either a first lateral edge or a second lateral edge of the sealing lip,
wherein the groove is one of a plurality of grooves defined in the abutment surface, wherein each groove of the plurality of grooves intersects with proximity to the respective first end portion and respective second end portion of the plurality of grooves,
wherein a slope of the second side surface is of a greater angle than that of a slope of the first side surface with respect to the coimterface,
wherein the groove has a first end portion, a second end portion, and a middle portion, wherein the slope of the first side surface varies with respect to a circumference of the sealing lip, and
wherein a first slope of the first side surface is of a greater angle along the middle portion of the groove than the slope of the first side surface along the first end portion and along the second end portion.

15. The seal according to claim 14, wherein:
the reinforcing structure includes a first section and a second section, which are at least substantially perpendicular to one another,
the sealing lip is connected to the second section of the reinforcing structure or is formed in a one-piece manner with the elastomer encasing the reinforcing structure, and
the abutment surface is configured to contact the counterface, which extends at least substantially parallel to the first section of the reinforcing structure.

* * * * *